US008805069B2

United States Patent
Li et al.

(10) Patent No.: US 8,805,069 B2
(45) Date of Patent: Aug. 12, 2014

(54) CELL-BASED COMPRESSION OF DIGITAL IMAGES

(75) Inventors: Guo Li, San Diego, CA (US); Kenneth A. Schmidt, El Segundo, CA (US); Dongpei Su, El Segundo, CA (US); Stephen L. Schafer, El Segundo, CA (US); Alfred Abkarian, El Segundo, CA (US); Sheng Li, El Segundo, CA (US); Michael M. Chang, El Segundo, CA (US)

(73) Assignee: KYOCERA Document Solutions Inc. (JP)

( * ) Notice: Subject to any disclaimer, the term of this patent is extended or adjusted under 35 U.S.C. 154(b) by 234 days.

(21) Appl. No.: 13/494,760

(22) Filed: Jun. 12, 2012

(65) Prior Publication Data

US 2013/0329237 A1 Dec. 12, 2013

(51) Int. Cl.
*G06K 9/00* (2006.01)
*G06T 9/00* (2006.01)

(52) U.S. Cl.
USPC .................................. 382/166; 358/1.9

(58) Field of Classification Search
USPC ............................................. 382/166; 358/1.9
See application file for complete search history.

(56) References Cited

U.S. PATENT DOCUMENTS

| 5,524,067 A | 6/1996 | Miyake et al. |
| 5,742,704 A | 4/1998 | Suzuki et al. |
| 5,915,079 A | 6/1999 | Vondran, Jr. et al. |
| 6,285,458 B1 | 9/2001 | Yada |
| 6,529,633 B1 | 3/2003 | Easwar et al. |
| 7,751,633 B1 | 7/2010 | Mukherjee |
| 8,508,449 B2* | 8/2013 | Broughton et al. ............ 345/88 |
| 2005/0213125 A1* | 9/2005 | Smith et al. ................... 358/1.9 |
| 2007/0201751 A1 | 8/2007 | Wu et al. |
| 2012/0154420 A1* | 6/2012 | Calandrino et al. .......... 345/589 |
| 2013/0329995 A1* | 12/2013 | Webb et al. ................... 382/167 |

FOREIGN PATENT DOCUMENTS

EP 0856988 A2 8/1998

OTHER PUBLICATIONS

"YCbCr," from Wikipedia, en.wikipedia.org/wiki/YCbCr accessed Jul. 31, 2012, pp. 1-5.
"JPEG," frow Wikipedia, en.wikipedia.org/wiki/JPEG accessed Jul. 31, 2012, pp. 1-16.
Extended European Search Report and Opinion for App. No. EP 13171543.5, mailed Mar. 5, 2014.

* cited by examiner

*Primary Examiner* — Yon Couso
(74) *Attorney, Agent, or Firm* — McDonnell Boehnen Hulbert & Berghoff LLP

(57) ABSTRACT

An m×n pixel cell may be obtained from an input image, each of the pixels having a respective color value. A characterization of the cell may be determined, including determining a lowest color value and a highest color value of the pixels cell. A difference between the highest color value and the lowest color value may be calculated. If the difference is less than or equal to a threshold difference, an output color value inclusively between the highest color value and the lowest color value may be selected, and a first representation of the output color value may be written to an output medium. If the difference is greater than the threshold difference, multiple output color values may be selected, and a second representation of the multiple output color values may be written to the output medium.

20 Claims, 12 Drawing Sheets

CELL-BASED COMPRESSION OF DIGITAL IMAGES

BACKGROUND

In recent years, various types of printing devices have become popular for both business and consumer use. In addition to traditional black and white printers, color printers, scanners, copiers, fax machines, and other components are now common. Multi-function peripherals (MFPs), that support two or more of these functions, are also widely available. As these devices have grown more prevalent, they are being used for processing of more sophisticated and complicated documents.

SUMMARY

In an example embodiment, an m×n pixel cell may be obtained from an input image. The input image may contain more than m×n pixels, and each of the m×n pixels in the m×n pixel cell may have a respective color value. A characterization of the m×n pixel cell may be determined. Determining the characterization may involve determining a lowest color value and a highest color value of the pixels in the m×n pixel cell. A difference between the highest color value and the lowest color value may be calculated. If the difference is less than or equal to a threshold difference, an output color value between the highest color value and the lowest color value, inclusively, may be selected, and a first representation of the output color value may be written to an output medium. The first representation may include a single-color opcode and an indication of the output color value. If the difference is greater than the threshold difference, multiple output color values may be selected, and a second representation of the multiple output color values may be written to the output medium.

In another example embodiment, an m×n pixel cell may be obtained from an input image. The input image may contain more than m×n pixels, and each of the m×n pixels in the m×n pixel cell may have a respective color value. A characterization of the m×n pixel cell may be determined, where determining the characterization may involve determining color values of the pixels in the m×n pixel cell. A difference between a highest color value and a lowest color value of the color values may be determined. If the difference is less than or equal to a threshold difference, an output color value between the highest color value and the lowest color value, inclusively, may be selected. A first representation of this output color value may be written to an output medium. The first representation may include a single-color opcode and an indication of the output color value. If the color values of the m×n pixel cell substantially consist of two color values, a second representation of the two color values may be written to the output medium. The second representation may include a two-color opcode, an indication of each of the two color values, and a per-pixel bitmap of the m×n pixel cell that associates each pixel in the m×n pixel cell with one of the two color values. If the color values of the m×n pixel cell substantially consist of three or four color values, a third representation of the three or four color values may be written to the output medium, where the third representation may include a four-color opcode, an indication of each of the three or four color values, and a per-pixel bitmap of the m×n pixel cell that associates each pixel in the m×n pixel cell with one of the three or four color values. If the color values of the m×n pixel cell substantially consist of more than four color values, a discrete cosine transformation (DCT) operation may be performed on the m×n pixel cell, and a fourth representation may be written to the output medium. The fourth representation may include a DCT opcode and a result of the DCT operation.

Additional embodiments may include a non-transitory computer-readable medium, having stored thereon program instructions that, upon execution by a computing device, cause the computing device to perform operations in accordance with either or both of the example embodiments above.

Further embodiments may include a computing system comprising at least one processor, data storage, and program instructions in the data storage that, upon execution by the at least one processor, cause the computing system to operate in accordance with either or both of the example embodiments above.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION OF THE DRAWINGS

Figure 1:
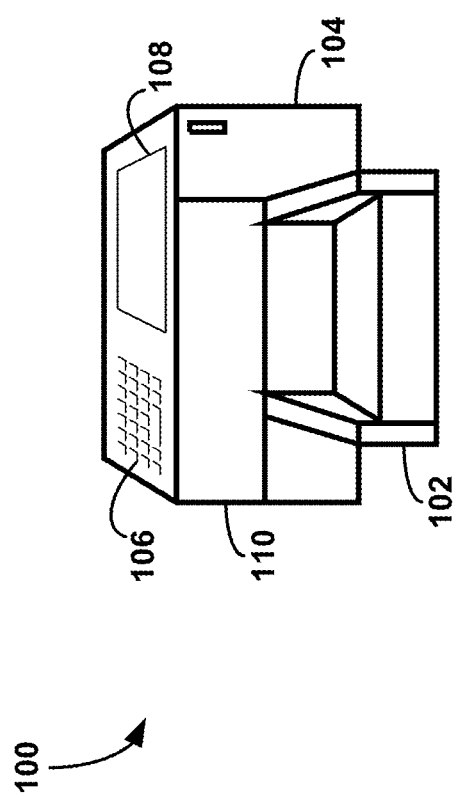
FIG. 1 depicts a printing device, according to an example embodiment.

Example methods and systems are described herein. Other example embodiments or features may further be utilized, and other changes may be made, without departing from the spirit or scope of the subject matter presented herein. In the following detailed description, reference is made to the accompanying figures, which form a part thereof.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. INTRODUCTION

Printing technology has evolved over the last 30-plus years from simple dot-matrix-based output devices producing only black and white images to today's advanced laser-based printing devices that can produce high-resolution color images. Additionally, modern printing devices may also function as copiers, scanners, and fax machines. To do so, they may be able to store numerous electronic documents that are queued for printing or faxing, or that have been scanned. Thus, many printing devices are specialized forms of computing devices that may include, for example, one or more processors, data storage, and input/output interfaces.

Regardless of whether a printing device is used in a residence, a business, or in another type of location, the printing device may be a shared resource that can be communicatively coupled to various other computing devices. Consequently, in some environments, the storage requirements of a printing device may be quite high, as numerous computing devices may be transmitting electronic documents to the printing device for printing. Typically, a printing device will print, copy, fax, and/or scan one electronic document at a time, in a first-come-first-served fashion. Therefore, the printing device may store a potentially large number of electronic documents that are waiting to be serviced. Since the cost of data storage (e.g., memory such as random access memory (RAM), solid-state memory, hard-drive memory, and/or flash memory) can be expensive, it may be beneficial to compress the stored electronic documents, in order to reduce the data storage requirements of the printing device. Additionally, since some electronic documents may be transferred to and/or from the printing device and a computing device, compressing these electronic documents may make transfers faster and use less network capacity.

Moreover, since print jobs may be large (e.g., a print job may include one or more electronic documents encompassing hundreds of pages), compressing queued print jobs in the queue saves short-term storage space before each job is printed. In addition, users may want to save print jobs in long-term storage for printing at a later time. Thus, compressing print jobs may allow more print jobs to be saved. Furthermore, the act of storing and retrieving large print jobs from long-term memory can be slow, but it may be expedited by compressing the print jobs to make them smaller in size.

2. EXAMPLE PRINTING DEVICE

FIG. 1 depicts an example printing device 100. Printing device 100 may be configured to print partially-stored and/or fully-stored electronic documents on various types of physical output media. These output media include, but are not limited to, various sizes and types of paper, overhead transparencies, and so on. Printing device 100 may be interchangeably referred to as a "printer."

Printing device 100 may serve as local peripheral to a computing device, such as a personal computer, a server device, a print server, etc. In these cases, printing device 100 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic documents for printing device 100.

On the other hand, printing device 100 may include a wireline or wireless network interface, such as an Ethernet or 802.11 (Wifi) interface. So arranged, printing device 100 may serve as a printing device for any number of computing devices that can communicate with printing device 100 over a network. In some embodiments, printing device 100 may serve as both a local peripheral and a networked printer at the same time. In order to use printing device 100, computing devices may install one or more printer drivers. These printer drivers may include software components that convert the electronic documents to be printed from various local representations stored on the computing devices to one or more representations supported by printing device 100.

Regardless, printing device 100 may be considered to be a computing device, and may carry out both printing-related and non-printing related tasks.

As noted above, printing device 100 may also include copier, fax, and scanner functions. In some embodiments, printing device 100 may use a scanner function to facilitate copier and/or fax functions. For instance, printing device 100 may scan a physical document into an electronic format, and then print the resulting electronic document to provide a copy, and/or transmit the resulting electronic document via a telephone interface to provide a fax function.

In order to support its various functions, printing device 100 may include a document feeder/output tray 102, paper storage 104, user interface 106, scanning element 108, and chassis 110. It should be understood that printing devices may take on a wide variety of forms. Therefore printing device 100 may include more or fewer components than depicted in FIG. 1, and/or components arranged in a different fashion than depicted in FIG. 1.

Document feeder/output tray 102 may hold physical documents (e.g., a stack of one or more sheets of paper) that are to be scanned, copied or faxed. Advantageously, document feeder/output tray 102 may allow printing device 100 to automatically feed multiple physical documents for processing by printing device 100 without requiring manual invention. Document feeder/output tray 102 may also include one or more separate output trays for holding physical documents that have been processed by printing device 100. These may include physical documents that have been scanned, copied or faxed by printing device 100, as well as physical documents that have been produced by, e.g., the fax and/or copying functions of printing device 100.

Paper storage 104 may include trays and/or feeding elements for various types of physical media. For instance, paper storage 104 may include separate trays for 8½×11 inch paper, A4 paper, letterhead paper, envelopes, and so on. For any function of printing device 100 that involves outputting physical media (e.g., printing, copying, and/or receiving a fax), paper storage 104 may supply the physical media.

User interface 106 may facilitate the interaction of printing device 100 with a human or non-human user, such as to receive input from a user and to provide output to the user. Thus, user interface 106 may include input components such as a keypad, keyboard, touch-sensitive or presence-sensitive panel, joystick, microphone, still camera and/or video camera. User interface 106 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 106 may also be configured to be able to generate audible output(s), via a speaker, speaker jack, audio output port, audio output device, earphones, and/or other similar devices, now known or later developed in the future.

Scanning element 108 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with printing device 100.

Chassis 110 may include a physical housing that contains and or interconnects various components of printing device 100, such as document feeder/output tray 102, paper storage 104, user interface 106, and scanning element 108. Additionally, chassis 110 may house other components not shown in FIG. 1. For example, chassis 110 may contain one or more toner cartridges, liquid ink jets, belts, rollers, and/or power supplies. Further, chassis 110 may include communication interfaces, such as a wireline and/or wireless network interfaces, a telephony interface (e.g., a RJ45 jack), a USB interface, a BLUETOOTH® interface, a card reader port, etc.

Figure 2:
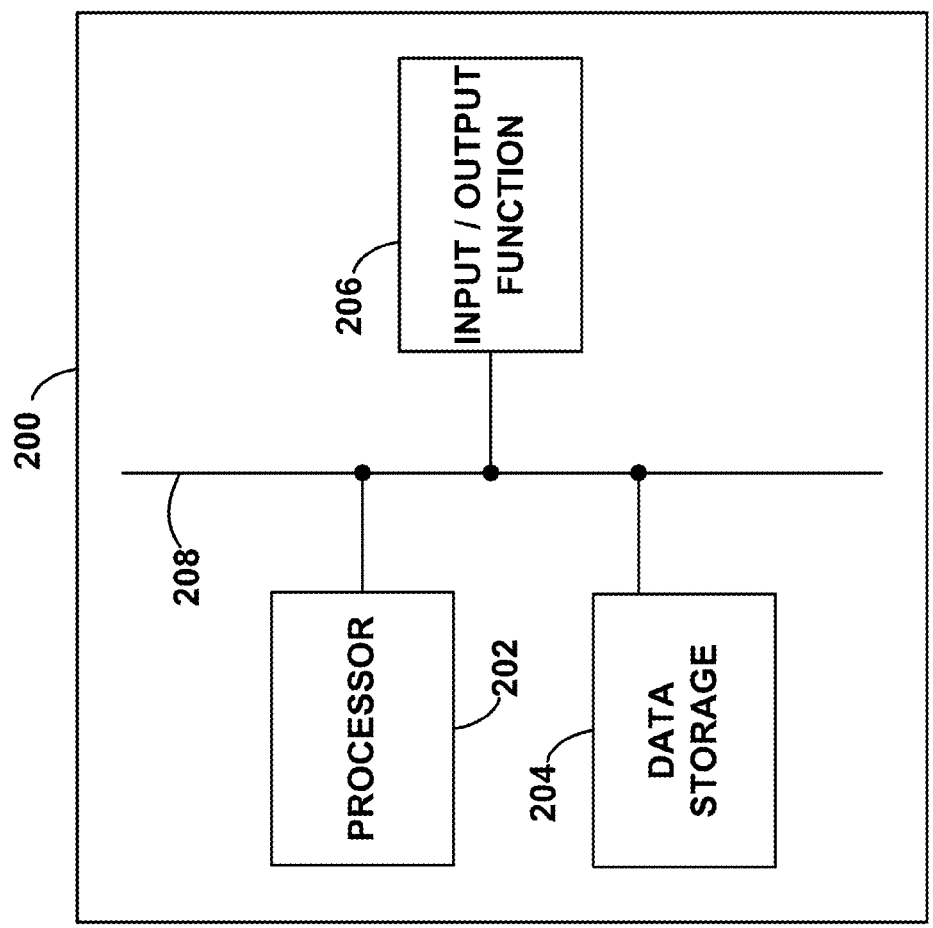
FIG. 2 is a block diagram illustrating computing components of a printing device, according to an example embodiment.

Moreover, as printing device 100 may be based on general-purpose and/or specially-designed computing device components, chassis 110 may also house some or all of these components. To that point, FIG. 2 depicts an example embodiment 200 of computing device components (e.g., functional elements of a computing device) that may be included in printing device 100.

Computing device components 200 may include a processor 202, data storage 204, and input/output function 206, all of which may be coupled by a system bus 208 or a similar mechanism. Processor 202 may include one or more central processing units (CPUs), such as one or more general purpose processors and/or one or more dedicated processors (e.g., application specific integrated circuits (ASICs) or digital signal processors (DSPs), etc.).

Data storage 204, in turn, may comprise volatile and/or non-volatile data storage and can be integrated in whole or in part with processor 202. Data storage 204 may store program instructions, executable by processor 202, and data that are manipulated by these instructions to carry out the various methods, processes, or functions described herein. Alternatively, these methods, processes, or functions can be defined by hardware, firmware, and/or any combination of hardware, firmware and software. Therefore, data storage 204 may include a tangible, non-transitory computer-readable medium, having stored thereon program instructions that, upon execution by one or more processors, cause printing device 100 to carry out any of the methods, processes, or functions disclosed in this specification or the accompanying drawings.

Input/output function 208 may include any of the functions and/or elements described in reference to user interface 106. Thus, input/output function 208 may serve to configure and/or control the operation of processor 202. Input/output function 208 may also provide output based on the operations performed by processor 202.

It should be understood that these examples of a printing device are provided for illustrative purposes. Further, in addition to and/or alternatively to the examples above, other combinations and/or sub-combinations of printer and computer technologies may also exist, amongst other possibilities, without departing from the scope of the embodiments herein.

Figure 3:
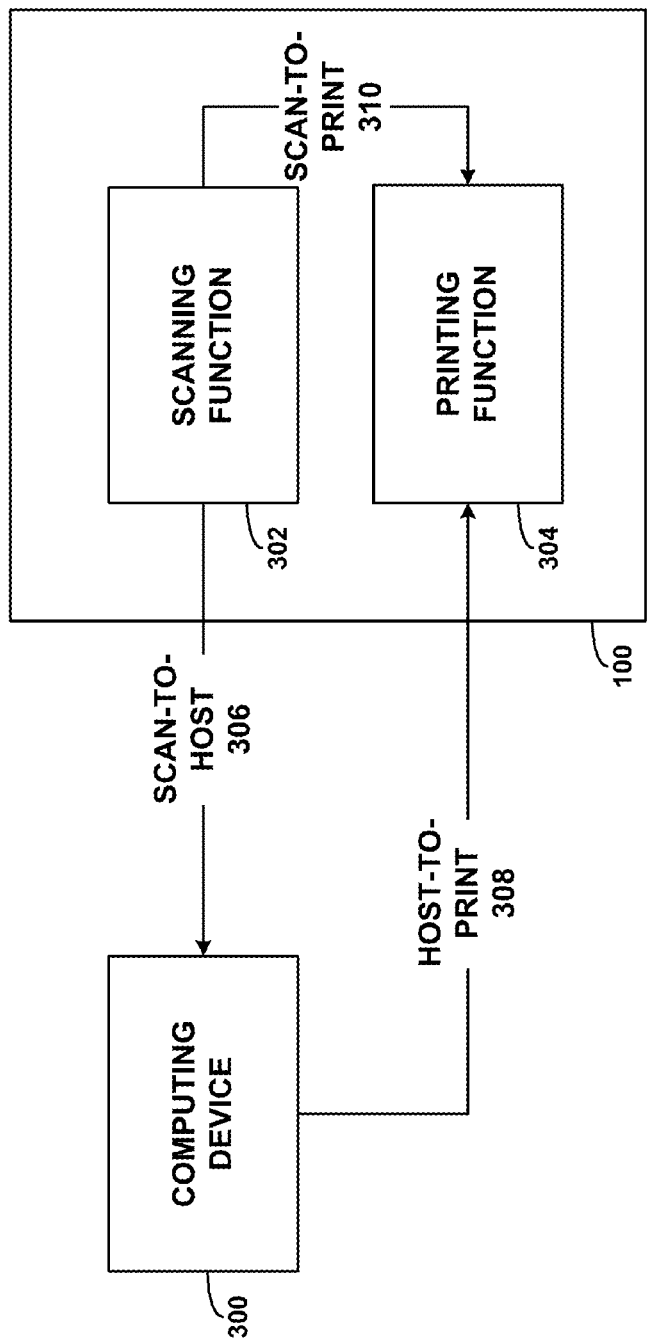
FIG. 3 is a block diagram illustrating various data paths involving a printing device, according to an example embodiment.

FIG. 3 depicts some of the possible data paths through which a representation of an electronic document processed by printing device 100 may pass. In FIG. 3 it is assumed that printing device 100 may include a scanning function 302 and a printing function 304. Each of these functions may be implemented in hardware, firmware, software, or any combination of hardware, firmware and/or software. Additionally, each of scanning function 302 and printing function 304 may communicate with computing device 300, and possibly with other computing devices as well. In some situations, the data paths supported by printing device 100 may be referred to a "pipelines."

A scan-to-print data path 310 may be supported by scanning function 302 and printing function 304. Scan-to-print data path 310 may be used, e.g., when a user instructs printing device 100 to copy a physical document. In response to this instruction, scanning function 302 may scan the physical document into an electronic document, and transmit the electronic document via scan-to-print data path 310 to printing function 304. Use of scan-to-print data path 310 may involve at least temporarily storing some or all of the electronic document in the data storage of printing device 100. Then, printing function 304 may print the electronic document to physical media (e.g., one or more sheets of paper).

A scan-to-host data path 306 may also be supported by scanning function 302 and computing device 300. Scan-to-host data path 306 may be used, e.g., when a user instructs printing device 100 to scan a physical document. The user may also instruct printing device 100 to transmit a representation of the resulting electronic document to computing device 100, or printing device 100 may be pre-configured to automatically transmit the electronic document to computing device 300. Thus, in response to this instruction, scanning function 302 may scan the physical document into an electronic document, and transmit the resulting electronic document via scan-to-host data path 306 to computing device 300. Use of scan-to-print data path 310 may involve at least temporarily storing some or all of the electronic document in the data storage of printing device 100, and transmitting a representation of the resulting electronic document to computing device 300.

A host-to-print data path 308 may be supported by computing device 300 and printing function 304. Host-to-print data path 308 may be used, e.g., when a user instructs computing device 300 to print an electronic document on printing device 100. In response to this instruction, computing device 300 may transmit a representation of the electronic document to printing function 304. Printing device 100, via printing function 304, may print the electronic document to physical media. Some or all of the electronic document may be stored in the data storage of printing device 100 before and/or during the printing of the electronic document.

Clearly, for at least one of the data paths discussed above, as well as possibly other data paths supported by printing device 100, an electronic document may require storage and/or transmission over a network or a cable. The efficiency of both the storage and transmission of electronic documents can be improved by compressing these electronic documents for storage and/or transmission. For example, if electronic documents can, on average be compressed to one-quarter their initial size, then about four times as many electronic documents can be stored in a fixed amount of data storage. Further, the transmission of these compressed electronic documents over a network or cable can occur about four times as fast as would transmission of the uncompressed electronic documents.

The following sections describe various embodiments that provide compression of electronic documents handled by printing device 100.

3. EXAMPLE COMPRESSION TECHNIQUES

In the past, lossy compression may have been used for some data paths, while lossless compression may have been used for other data paths. (Lossy compression techniques compress data by discarding some of it, while lossless compression techniques compress data without discarding any of it.) For example, in some implementations, host-to-print data path 308 may utilize lossless compression in order to preserve sharp edges of text and line art in printed versions of electronic documents. On the other hand, scan-to-host data path 306 and scan-to-print data path 310 may utilize lossy compression in order to efficiently store and transmit scanned physical documents containing graphical images. Printing device 100 may be made more efficient and its software and/or hardware implementation may be simplified by using the same or a similar compression technique for at least some (and perhaps all) of its data paths.

a. Example Image

Figure 4:
FIG. 4 depicts an example image that may be contained in an electronic document, according to an example embodiment.

FIG. 4 depicts at example image 400 that may be included on or within a physical or electronic document handled by printing device 100. While example image 400 appears in black and white, color images with similar characteristics may also be handled by printing device 100.

As can be seen in FIG. 4, example image 400 contains various types of content. For instance, example image 400 contains both text and line art with sharp edges. Further, example image 400 also contains sections containing a continuous tone (e.g., the upper-left-hand corner of example image 400), as well as sections containing photorealistic data (e.g., the lower-right-hand-corner of example image 400). Example image 400 illustrates a common type of image that is used in business printing, e.g., in pages of a brochure, magazine, flyer, or advertisement.

A unified compression technique may be able to accurately represent the sharp edges and lines of example image 400, while still using lossy compression in order to reduce the storage requirements of an electronic document containing example image 400.

b. Example Image Color Models

Electronic documents can be represented using a number of color models. Thus, a robust compression technique should be able to operate on some or all of these models. Further, the compression technique may include preprocessing that is specific to individual color models.

For example, the red-green-blue (RGB) color model may be used for display of images on electronic output devices, such as televisions, monitors, and computer screens. RGB is an additive color model in which red, green, and blue light are added together in various ways to produce a spectrum of colors. For instance, cyan may be formed by combining green and blue, yellow may be formed by combining red and green, magenta may be formed by combining red and blue, and white may be formed by combining red, green, and blue.

A particular pixel of an RGB image may be expressed as a three-channel tuple (R,G,B), each channel of which can vary from zero to a pre-defined maximum value (e.g., 255). If all of the channels are at zero, the result may be black. If all of the channels are at the maximum value, the result may be the brightest representable white.

RGB output is typically device-dependent, in that different output devices may display the same RGB image in a different fashion. Thus, in some cases, these differences may be perceivable by humans. In some embodiments, physical documents scanned into printing device 100 using scan-to-host data path 306 may be encoded using an RGB color model.

The cyan-magenta-yellow (CMY) color model may be used for the printing of color images by printing devices. CMY is a subtractive color model in which cyan, yellow, and magenta are applied to a white surface in various ways to reproduce a spectrum of colors. For instance, red can be formed by combining magenta and yellow, blue can be formed by combining cyan and magenta, and green can be formed by combining cyan and yellow. Thus, the CMY color model might be considered a complement of the RGB color model.

A particular pixel of a CMY image may be expressed as a three-channel tuple (C,M,Y), each channel of which can vary from zero to a pre-defined maximum value. If all of the channels are at zero, the result may be white. If all of the channels are at the maximum value, the result may be black.

Like, RGB output, CMY output is typically device-dependent, in that the printed output of the same CMY image on different printing devices may appear to be different. In some cases, these differences may be perceivable by humans. In some embodiments, electronic documents printed by printing device 100 using host-to-print data path 308 and/or scan-to-print data path 310 may be encoded using a CMY color model.

In some embodiments, a four-channel CMYK color model can also be used. This four-channel model of CMYK may be similar to or the same as the CMY color model, with the exception that a key (black) channel is also used. In addition to possibly combining cyan, magenta, and yellow to form black, the separate key (black) ink source may be used to form black. Thus, a particular pixel of a CMYK image may be expressed as a four-channel tuple (C,M,Y,K), each channel of which can vary from zero to a pre-defined maximum value.

Using the CMYK color model, the same colors as the CMY model can be supported, but less ink is typically used because the K colorant can replace mixtures of the C, M, and Y colorants. However, the CMYK color model may not always be able to be conveniently converted to and from other color models, because the addition of the K colorant adds redundancy, e.g., the same color can be a result of mixing different C, M, Y, and K combinations.

An additional color model is gray, also referred to as grayscale, which may be used for the representation of black and white images. Unlike the RGB and CMY/CMYK color models, each pixel of the gray color model is expressed using a single channel that encodes the pixel's intensity. The values used by the gray channel can vary from zero for black, to a pre-defined maximum value for white (e.g., 255). In some embodiments, one or more of the data paths supported by printing device 100 may be able to encode images using the gray color model.

Another color model is YCbCr. In some implementations, this color model may be used as an alternative representation of an image. Particularly, the Y channel may represent the brightness of a pixel, and the Cb and Cr channels may represent the blue-yellow chrominance and red-green chrominance, respectively. The YCbCr color model has a well-defined relationship with the RGB and CMY colors models and can be converted to and from either of these color models with relative ease.

An additional advantage to the YCbCr color model is that compression of images encoded using the YCbCr color model tends to be more efficient than compression of images encoded in the RGB or CMY/CMYK color models. Particularly, the human eye is not very good at detecting high-frequency (e.g., rapidly varying) chrominance information in an image. Thus, images encoded using the YCbCr color model can exploit this information by ignoring high-frequency components of the Cb and Cr channels. Thus, as discussed in more detail below, images encoded in a particular color model may be converted to the YCbCr color model before compression in order to improve compression performance.

c. Overview of Example Compression Techniques

Figure 5A:
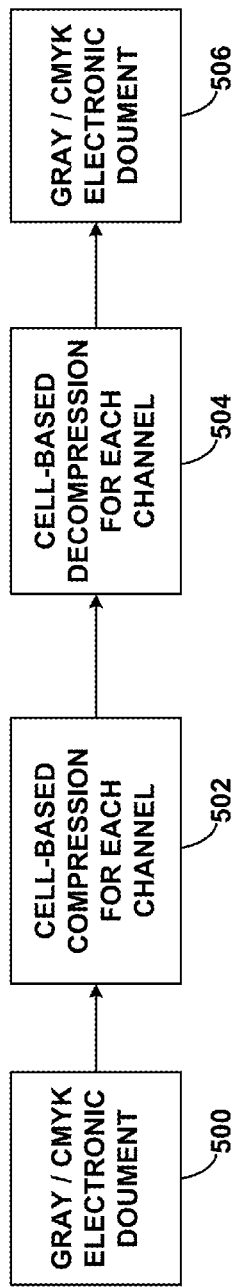
FIG. 5A depicts an example compression/decompression technique, according to an example embodiment.
Figure 5B:
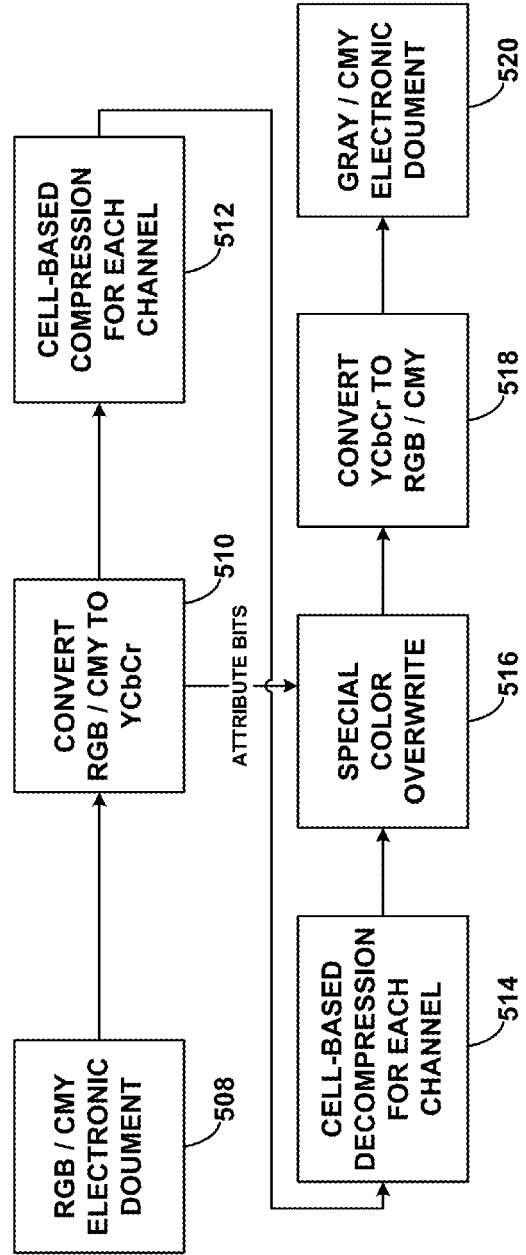
FIG. 5B depicts another example compression/decompression technique, according to an example embodiment.

A high-level overview of example compression techniques are shown in FIGS. 5A and 5B. In FIG. 5A, at block 500, an electronic document may be in either the gray or CMYK color model. At block 502, cell-based compression (discussed in detail below) may be applied to each channel of the electronic document. Thus, for gray electronic documents, cell-based compression may be applied to just the gray channel. For CMYK electronic documents, cell-based compression may be applied separately for each of the C, M, Y, and K channels. The result of block 502 may be a bitstream representing a compressed version of the electronic document.

At block 504, cell-based decompression (also discussed in detail below) may be applied to each channel of the electronic document. This may result in the re-creation of the gray or CMYK electronic document at block 506. However, it should be noted that if the cell-based technique uses lossy compression, the electronic document of block 506 may be different from the electronic document of block 500. However, the difference between these versions of the electronic document may be slight, and therefore might not be perceived by humans.

In FIG. 5B, at block 508, an electronic document may be in either the RGB or CMY color model. At block 510, this electronic document may be converted to the YCbCr color model. Additionally, attribute bits may be stored for the electronic document. For instance, if a pixel is pure white, pure black, or another grayscale color, one or more attribute bits may encode this information and may be separately stored and compressed (e.g., in a lossless fashion) for the pixel.

At step 512, cell-based compression may be applied to each channel of the electronic document. Thus, cell-based compression may be applied separately for each of the Y, Cb, and Cr channels. The result of block 512 may be a bitstream representing a compressed version of the electronic document.

At block 514, cell-based decompression may be applied to each channel of the electronic document. This may result in the re-creation the YCbCr version of the electronic document. However, it should be noted that if the cell-based technique uses lossy compression, the re-created version of the electronic document may be different from the electronic document of block 510. However, as was the case for the technique of FIG. 5A, the difference between these versions of the electronic document may be slight, and therefore might not be perceived by humans. Additionally, at block 516, the information (if any) encoded in the attribute bits compressed and stored at block 510 may be decompressed and integrated back into the re-created YCbCr version of the electronic document.

At block 518, the re-created YCbCr version of the electronic document may be converted back to its original RGB or CMY color model. This may result in the re-creation of an electronic document that is the same as or similar to the RGB or CMY electronic document at block 520.

It should be understood that the compression techniques illustrated in FIGS. 5A and 5B are merely for purposes of example. Accordingly, various alternative techniques still are encompassed by the embodiments herein. For instance, conversion to and from the YCbCr color model may be omitted. Further, the separate compression, storage, and decompression of the attribute bits may also be omitted.

d. Example Cell-Based Compression

One aspect of cell-based compression is that it may divide each color channel of an electronic document into one or more m×n pixel cells, and then compress each cell in a partially-independent or fully independent fashion. For example, m might be 8 and n might be 4. Alternatively, m might be 8 and n might be 8 as well. Other values of m and n may be used. Each cell may be evaluated to determine what type of compression methods might be most efficient for compressing the data in that cell. For example, if a cell consists entirely of pixels that are the same color, the data in the cell may be very efficiently compressed into a representation of the color and perhaps some overhead data. However, if a cell contains part of a complex, multi-color photorealistic image, the data in the cell may not be able to be compressed at such a high compression ratio.

Figure 6:
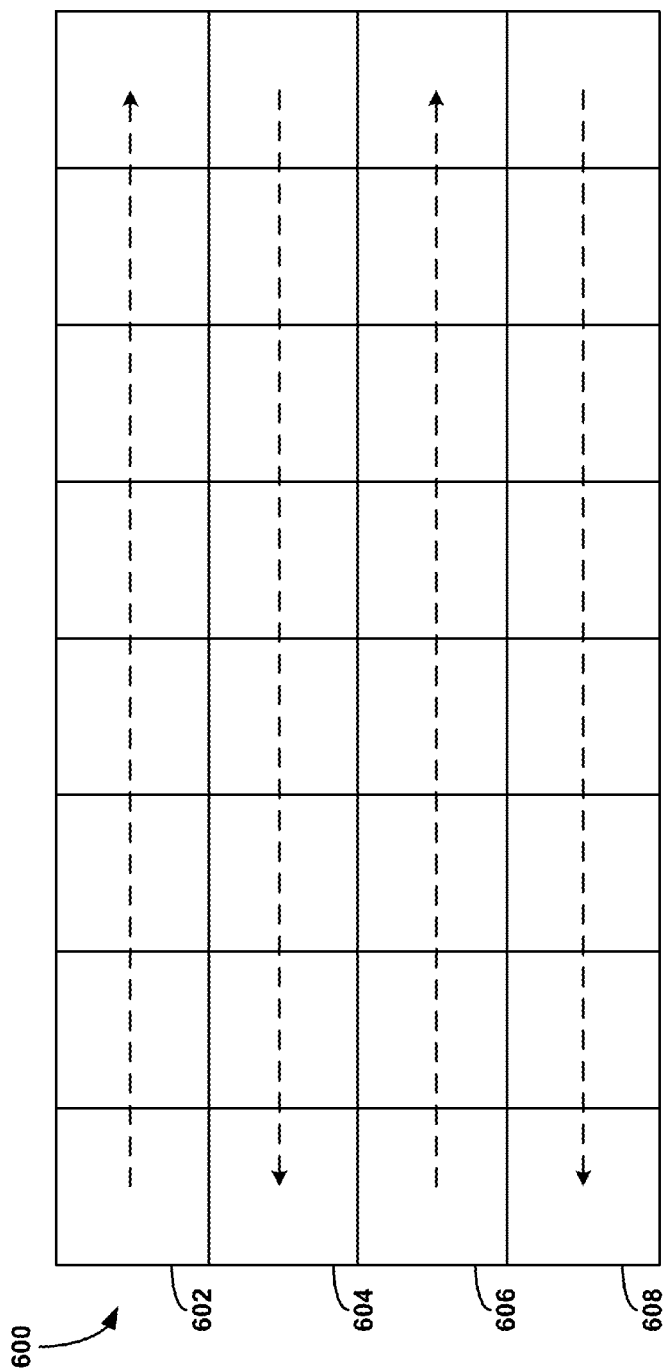
FIG. 6 depicts a method of evaluating and compressing a series of m×n pixel cells, according to an example embodiment.

FIG. 6 depicts a method of evaluating and compressing a series of cells in a color channel 600 of an electronic document. Starting with the left-most cell of row 602, each cell is compressed according to the cell-based technique. In a sense, the compression process moves left-to-right along row 602. Then, for row 604, the compression process moves right-to-left. For row 606, the compression process once again moves left-to-right. For row 608, the compression process once more moves right-to-left. Nonetheless, the cells of color channel 600 could be compressed in a different order.

Figure 7:
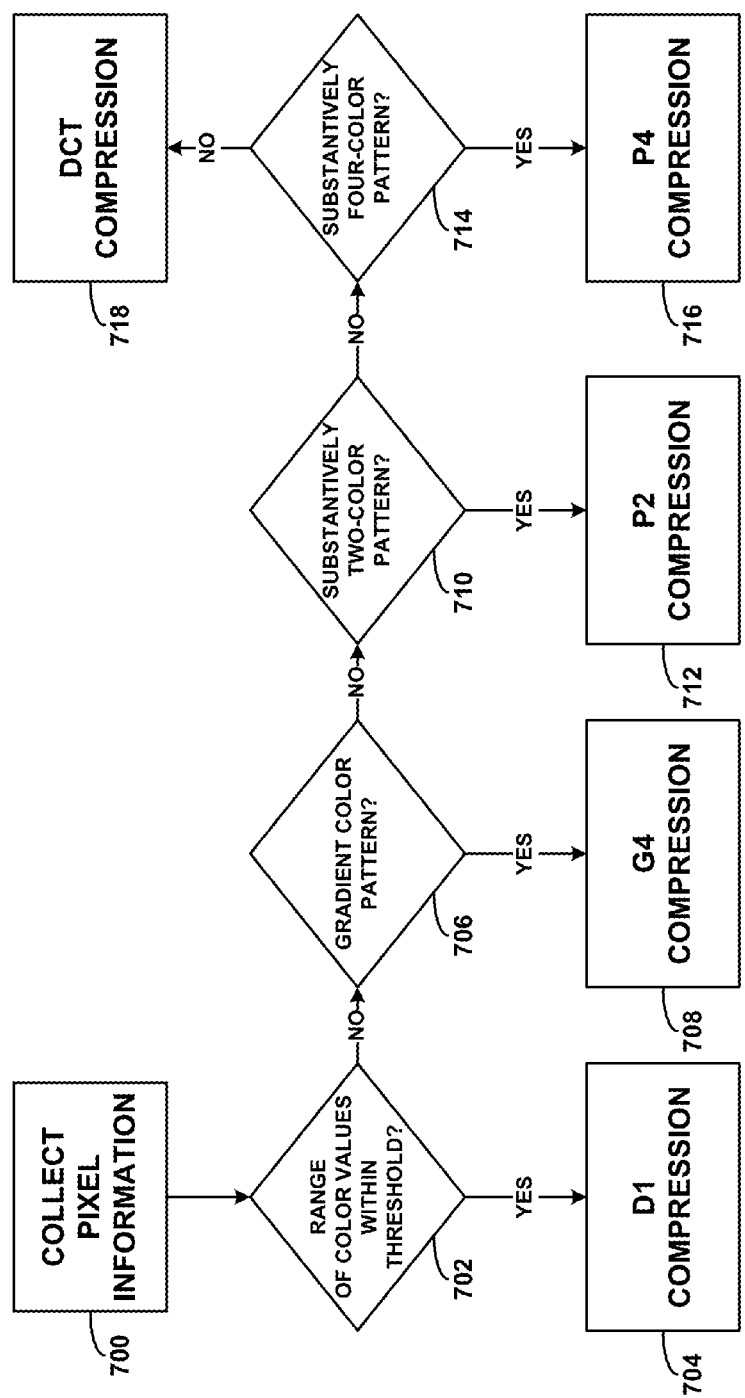
FIG. 7 depicts a compression technique, according to an example embodiment.

As noted above, the exact compression method used for a given cell may depend on the data contained within the cell. FIG. 7 is a flow chart that indicates one possible way of determining which compression technique should be applied to a cell. FIG. 7 refers to a number of compression methods, such as D1, G4, P2, P4, and DCT, that will be explained in more detail below.

At block 700, pixel information may be collected from a given cell. This information may include the cell's minimum color value and maximum color value. Further, a color value histogram may also be calculated for the cell.

Herein a "color value" may refer to a numerical representation of a pixel's color. Example color values may be represented by 8 bits, for a range of 0-255, or by 16 bits, for a range of 0-65535. However, color values can be represented by a different number of bits and thus may take on different ranges as well. Further, color values may be used to represent black, white, and various shades of gray in between black and white, even though black and/or white may not be considered to be "colors" under some theories of color.

Additionally, an estimation of whether the cell contains a color gradient may be performed. This estimation may determine whether the color values in the cell can be accurately represented by a four-point gradient with bi-linear interpolation, wherein each point is a respective corner pixel of the cell. If the actual color values for each non-corner pixel in the cell are within a gradient threshold of the pixel's bi-linearly interpolated value, then the cell may be a candidate for gradient (G4) compression.

At block 702, the range of color values in the cell may be determined and compared to a color range threshold. If the range is within the color range threshold, D1 compression may be applied to the cell at block 704. Otherwise, at block 706, if the pixels in the cell can be represented by a four-point gradient with bi-linear interpolation (as determined in block 700), then G4 compression may be applied to the cell at block 708. The estimation of whether the cell contains a color gradient may be performed in block 706 rather than in block 700.

If the cell does not contain a color gradient, then, at block 710, it may be determined whether the cell contains a substantively two-color pattern. If this is the case, then P2 compression may be applied to the cell at block 712. Otherwise, at block 714, it may be determined whether the cell contains a substantively four-color pattern. If this is the case, then P4 compression may be applied to the cell at block 716. If the cell does not contain a substantively four-color pattern, then, at block 718, discrete cosine transform (DCT) compression may be applied to the cell.

FIG. 7 illustrates just one possible arrangement of cell-based compression. Other arrangements may exist, and these arrangements may use different compression methods, and/or may apply different logic to determine which compression method to use for a given cell. In general, FIG. 7 illustrates a process in which more efficient compression methods (in terms of the number of bits used to encode a compressed representation of the cell) are preferred over less efficient compression methods. The next several sections describe the various compression methods in more detail.

i. D1 Compression

D1 compression may be used when all of the pixels in a given cell can be represented using a single color value. This does not mean that all pixels in the cell need to have the same color value. D1 compression may be used when the difference between the cell's maximum color value and minimum color value is within a pre-determined color range threshold.

For example, suppose that each pixel in the cell takes on a value from 0 to 255. If the color range threshold is 3 and all pixels have a color value of either 74, 75, or 76, then D1 compression may be applied to this cell. One of the three color values present (e.g., the middle color value of 75) may be used to represent the color values of all pixels in the cell.

In this way, the amount of data needed to represent the cell can be dramatically reduced. Even though this compression is lossy, when the threshold is sufficiently small, the loss is unlikely to be noticed by human observers. Additionally, compression efficiency and image quality can be traded off with one another by changing the color range threshold. For instance, a color range threshold of 10 may result in more efficient compression but lower image quality than a color range threshold of 2.

In some cases, multiple adjacent cells (e.g., cells in a row or column) may all be well-represented using D1 compression and the same color value. Thus, the D1 compression method allows for a run length to be encoded along with the color value. The run length represents how many subsequent cells were also compressed using D1 compression and the color value. Alternatively, the run length may represent how many total cells were compressed using D1 compression and the color value.

A variation of the D1 compression method, which may be referred to as D1D compression, may be used when the color value is a default color. In the YCbCr color space's Y channel, the gray color space, and all CMYK color spaces, the default values may be 0 and 255. In the YCbCr color space's Cb and Cr planes, the default values may be 128 and 255. D1D compression has a somewhat more efficient encoding than D1 compression. As there are only a limited number of default values (e.g., 2) in a color space, these default color values can be represented with a small number of bits (e.g., 1 per color value). Consequently, D1D compression may require fewer bits per cell than D1 compression.

ii. G4 Compression

Figure 8:
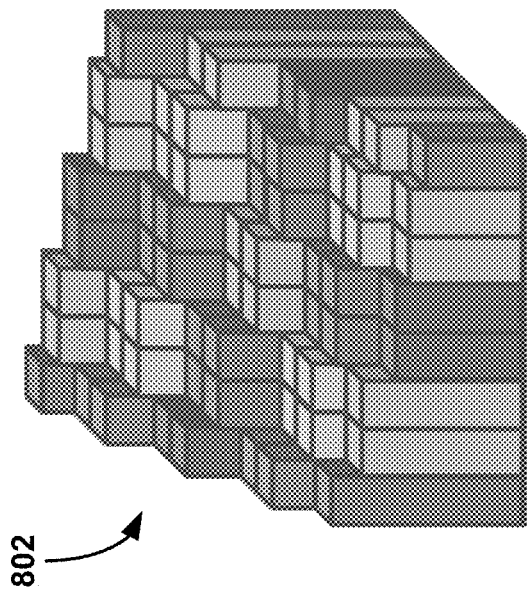
FIG. 8 depicts aspects of gradient compression, according to an example embodiment.
Figure 8:
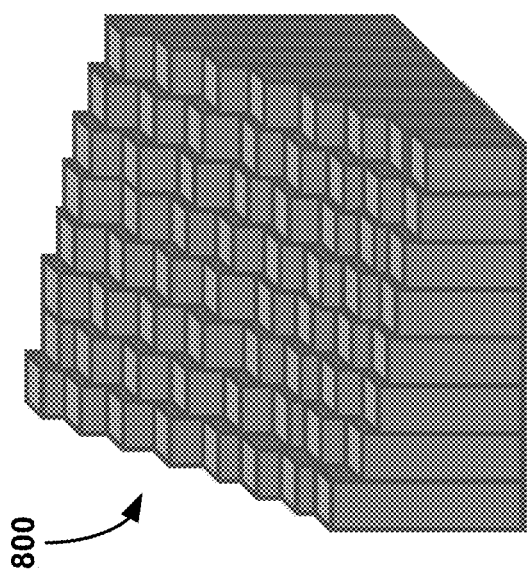

As noted above, G4 compression may be used when the color values in the cell can be reasonably well-represented by a four-point color gradient with bi-linear interpolation, wherein each point is a respective corner pixel of the cell. FIG. 8 illustrates the operation of this method. Blocks 800 and 802 represent the color values of pixels in an 8×8 pixel cell. The individual pixels can be located using the x-axis and the y-axis, and the color of each respective pixel is represented by the z-axis height associated with the pixel. (For example, a low color value may be represented by a small height on the z-axis, while a high color value may be represented by a large height on the z-axis.)

Block 800 is an example of a four-point color gradient in a cell. Each non-corner pixel has a respective color value such that the color values of the non-corner pixels form a smooth transition between the color values of the corner pixels. To determine whether a cell is to be encoded using G4 compression, a representation, such as block 802, may be formed based on the color values in the cell's corner pixels. For instance, using a form of bi-linear interpolation, each non-corner pixel may be associated with a "proposed" color value. As shown in block 802, the pixels with the same proposed color value may be grouped in units of 2 or 4. Units of more or fewer pixels may be used as well. Then, for each non-corner pixel, the respective proposed color value may be compared to that pixel's actual color value. If the difference between these color values is less than a gradient threshold for all non-corner pixels, G4 compression may be used.

iii. P2 Compression

P2 compression may be used when all of the pixels in a given cell can be represented using two color values. This does not mean that all pixels in the cell need to have one of these two color values. Instead, P2 compression may be used when all of the color values in the cell are clustered around (e.g., no more than a given threshold from) two color values. For instance, if the pixels in a cell can take on color values between 0 and 255, but all color values are either 75, 76, 124, or 125, two of these color values may be chosen, one to represent each cluster. Thus, a color value of 75 may be used to represent the color in pixels that have a color value of 75 or 76, and a color value of 124 might be used to represent the color in pixels that have a color value of 124 or 125.

Figure 9:
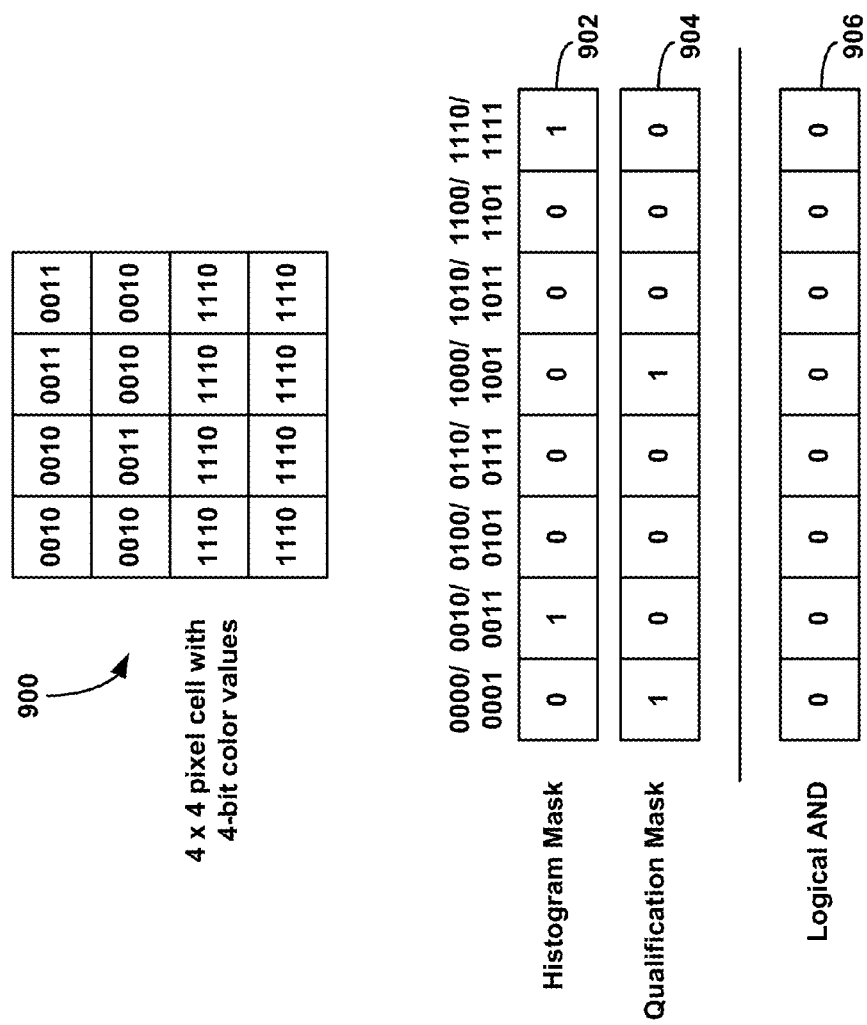
FIG. 9 depicts aspects of two-color compression, according to an example embodiment.

One way in which a cell may be evaluated to determine whether it is a candidate for P2 compression is illustrated in FIG. 9. Cell 900 is an example 4×4 pixel cell with 4-bit color values of 2 (0010 binary), 3 (0011 binary), and 14 (1110 binary). Although cell 900 has more than two color values, P2 compression may be used for cell 900 because color value 2 and color value 3 may be able to be represented with a single color value (e.g., one of color value 2 and color value 3).

Accordingly, cell 900 may be evaluated for P2 compression using a three-step process. In the first step, a histogram mask 902 may be determined for cell 900. For a cell with c color values, a histogram mask may be c/2 bits in length. For example, cell 900, which has 16 possible color values, has histogram mask 902 of 8 bits in length.

Further, each bit in histogram mask 902 represents a different pair of two sequential color values. Thus, the left-most bit in histogram mask 902 represents color values 0 and 1, the second-leftmost bit histogram mask 902 represents color values 2 and 3, and so on. A given bit in histogram mask 902 is set to 1 if at least one of the two color values represented by the bit is present in cell 900. Otherwise, the bit is set to 0. Thus, for histogram mask 902, only the bit representing color values 2 and 3, and the bit representing color values 14 and 15 are set to 1.

Additionally, a qualification mask may be determined for the cell. In the qualification mask, the bits representing the lowest and highest color values in the cell may be set to 0. Additionally, one or two more bits to the right of the bit representing the lowest color value, as well as one or two more bits to the left of the bit representing this highest color value, may also be set to 0. All other bits may be set to 1. Thus, for qualification mask 904, the second-leftmost bit is set to 0 because it represents color value 2, the lowest color value in cell 900. Additionally, the two bits to the right of the second-leftmost bit are also set to 0. Also, the rightmost bit is set to 0 because it represents color value 14, the highest color value in the cell. The two bits to the left of the rightmost bit are also set to 0.

A logical AND operation may be performed on the histogram mask and the qualification mask. If the result is 0 (i.e., all bits in the result are 0) then P2 compression may be used for the cell. Otherwise, P2 compression might not be used for the cell. Since logical AND 906 in FIG. 9 is 0, cell 900 qualifies for P2 compression. However, if any one pixel of cell 900 were changed to contain the color value 8 or the color value 9, cell 900 would not qualify for P2 compression.

A variation of the P2 compression method, which may be referred to as P2D compression, may be used when one or more default color values appear in a cell. As noted above, in the YCbCr color space's Y channel, the gray color space, and all CMYK color spaces, the default values may be 0 and 255. In the YCbCr color space's Cb and Cr planes, the default values may be 128 and 255. If only default color values are present in the cell and no non-default color values are present in the cell, P2D compression may be used. On the other hand, variations may exist wherein P2D compression can be used if color values within a given threshold of each default color value are present in the cell. P2D compression has a somewhat more efficient encoding than P2 compression.

iv. P4 Compression

P4 compression may be used when all of the pixels in a given cell can be represented using three or four color values. For example, if the histogram that may be produced at step 700 indicates that only three or four color values are present in a cell, then P4 compression may be used.

Alternatively or additionally, P4 compression may be used when more than four color values are used in a cell, but all color values present are clustered around (e.g., no more than a given threshold from) four color values that can be used to represent the cell. For example, if the given threshold is 1 and the cell contains color values of 10, 11, 56, 213, 214, and 255, then P4 compression may be used for the cell, e.g., with color values 10, 56, 213, and 225.

v. DCT Compression

DCT compression may be used for any color pattern in a cell. In some embodiments, DCT compression may be used as a last resort if the cell is not compressed using D1, G4, P2, or P4 compression. For a cell that is compressed using DCT compression, the following steps may be performed: a DCT transform, scaling, quantization, reordering from a two-dimensional coefficient array to one-dimensional data, and Huffman entropy coding. In some embodiments, the DCT encoding may be a collection of quantized DCT coefficients packaged according to a subset of the Joint Picture Experts Group (JPEG) standard, with Huffman encoding. Generally, DCT compression is the least efficient of the compression methods presented herein.

e. Example Encoding of Cell-Based Compression

One possible compressed bitstream encoding of the above compression methods is shown in Table 1. Table 1 represents how a given m×n pixel cell may be encoded with bits when compressed. Other encodings not shown herein may also be possible.

TABLE 1

Example compressed bitstream encodings for each compression method.

| Compression Method | Opcode (2-3 bits) | Options (0-2 bits) | Color Values (0-4 bytes) | Raster (0-n bytes) | Run Length (0-1 bytes) |
|---|---|---|---|---|---|
| D1D | 000 | V/R | | No | 0-1 bytes |
| D1 | 001 | V'/R | Color Value (1 byte) | No | 0-1 bytes |
| P2D | 010 | | | Yes | 0 bytes |
| P2 | 011 | L | Color Values (2 bytes) | Yes | 0 bytes |
| P4 | 100 | L' | Color Values (4 bytes) | Yes | 0 bytes |
| G4 | 101 | | Color Values (4-bytes) | No | 0 bytes |
| DCT | 11 | | | | 0 bytes |

The compression method column indicates the compression method used to encode the cell, and includes each of the example compression methods discussed above, as well as variations of some. The opcode column indicates a 2-3 bit representation indicating each respective compression method. In some embodiments, a cell's opcode may be placed at the beginning of the cell's compressed bitstream encoding.

The options column may contain one or more options that may be specific to the compression method being encoded. For instance, the D1D compression method encodes an entire cell as one of two possible default values. The V bit of the options column may encode which default value is being encoded (e.g., V=0 for the lower default value and V=1 for the higher default value).

As another example, the D1 compression method encodes an entire cell as one of, e.g., 256 possible values. The V' bit in the options for D1 compression indicates that the options fields are followed by 1 byte that encodes the value for the cell. For both D1D and D1 compression, the R bit indicates whether the run length byte (see the discussion below of the run length column) is present.

As a further example, the P2 compression method may include the L bit, which indicates the presence of two color values following the L bit. These color values may be the color values that the P2 compression method uses to represent all color values in a compressed cell. Similarly, the P4 compression method may include the L' bit, which indicates the presence of four color values following the L' bit. These color values may be the color values that the P4 compression method uses to represent all color values in a compressed cell.

The Color Values column may contain one or more color values used to represent the compressed cell. As noted above, the D1, P2, ad P4 compression methods specify 1, 2, and 4 color values, respectively. Each color value may be represented by an appropriate number of bits (e.g., 8 bits for a color value range of 0-255).

The Raster column may represent a one-bit-per-pixel or 2-bit-per-pixel representation (e.g., a bitmap) of the color values of each respective pixel in the cell. For instance, P2D and P2 compression may use 1 bit per pixel to represent which of the two color values is used for each respective pixel in the cell. Similarly, P4 compression may use 2 bits per pixel to represent which of the four color values is used for each respective pixel in the cell. The representations referred to in the Raster column be compressed further using a form of run length encoding.

The Length column may contain an optional one-byte encoding of a run length. In some embodiments, the length column may only be used for the D1D and D1 compression methods, in which a single color value can be used to represent an entire cell. In some cases, two or more sequential cells in an image may all be able to be encoded using the same single color value. Thus, the byte in the length column may indicate the number of sequential cells using the same color value for D1D or D1 compression.

Although not explicitly shown in Table 1, DCT compression may result in a cell being represented by a bitstream of the DCT opcode followed by an encoded result of the DCT compression method.

f. Example Cell-Based Decompression

Once a number of cells are compressed using, for example, the compression methods and encodings discussed above, they may be efficiently stored and/or transmitted over a cable or network. Nonetheless, at some point, the cell may be decompressed into an approximation of the original image. Since the cell-based compression techniques described herein can be lossy, the decompressed image may differ, at least to some extent, from the original image. However, in many scenarios, this difference will either be unlikely to be perceived by a human, or considered to be an acceptable version of the original image.

The cells encoded with the compression encoding of Table 1 can be decoded and decompressed as follows. For a given cell encoding, the opcode is read. Based on the value of the opcode, any applicable options, color values, rasters, and/or lengths can be determined from the bits following the opcode. From these parameters, a decompressed version of the cell can be reconstructed. Then, the next opcode is read and so on until the image is reconstructed.

For example, if the opcode is 000, indicating D1D encoding, the V bit may be read to determine the color value, and the R bit may be read to determine whether a run length is present. Then, a number of cells commensurate with the run length are created with all pixels in each cell exhibiting the default color value indicated by the V bit.

If the opcode is 001, indicating D1 compression, the V' bit and the color value field may be read to determine the color value. The R bit may also be read to determine whether a run length is present. Then, a number of cells commensurate with the run length are created with all pixels in each cell exhibiting the color value indicated by the color value field.

If the opcode is 010, indicating P2D compression, the raster field may be read. A cell may be created with each pixel taking on a color value of either the low default color value or the high default color value, in accordance with the bitmap of the raster field.

If the opcode is 011, indicating P2 compression, the L bit, the color values field, and the raster field may be read. Then, a cell may be created with each pixel taking on one of the two color values in accordance with the bitmap of the raster field.

If the opcode is 100, indicating P4 compression, the L' bit, the color values field, and the raster field may be read. Then, a cell may be created with each pixel taking on one of the four color values in accordance with the bitmap of the raster field.

If the opcode is 101, indicating G4 encoding, the color values field may be read to determine the color values of the four corner pixels. Then, a cell may be created with each corner pixel taking on one of the color values indicated by the color values field, and bi-linear interpolation may be used to determine the color values of the non-corner pixels.

If the opcode is 11, indicating DCT compression, the result of the DCT compression method may be read and a cell may be created in accordance with this DCT encoding.

g. Compression Efficiency

The cell-based compression techniques described herein can be very efficient. In practice, an average compression ratio of 20:1 has been observed. The following example illustrates this efficiency.

Suppose that a high speed printing system prints 180 pages per minute (3 pages per second) using a host-to-print data path, that the resolution of these pages is 600 dots-per-inch (dpi) for each 10 inch by 8 inch page, and that three color channels are used, each encoding a 1-byte color value. Thus, the total amount of uncompressed data transferred in 1 second is 600 (dots)×600 (dots)×10 (inches)×8 (inches)×3 (color channels)×3 (pages), which equals about 247 megabytes. Using the cell-based compression techniques described above, this data amount may, on average, be reduced to about 12.4 megabytes.

4. EXAMPLE OPERATION

Figure 10:
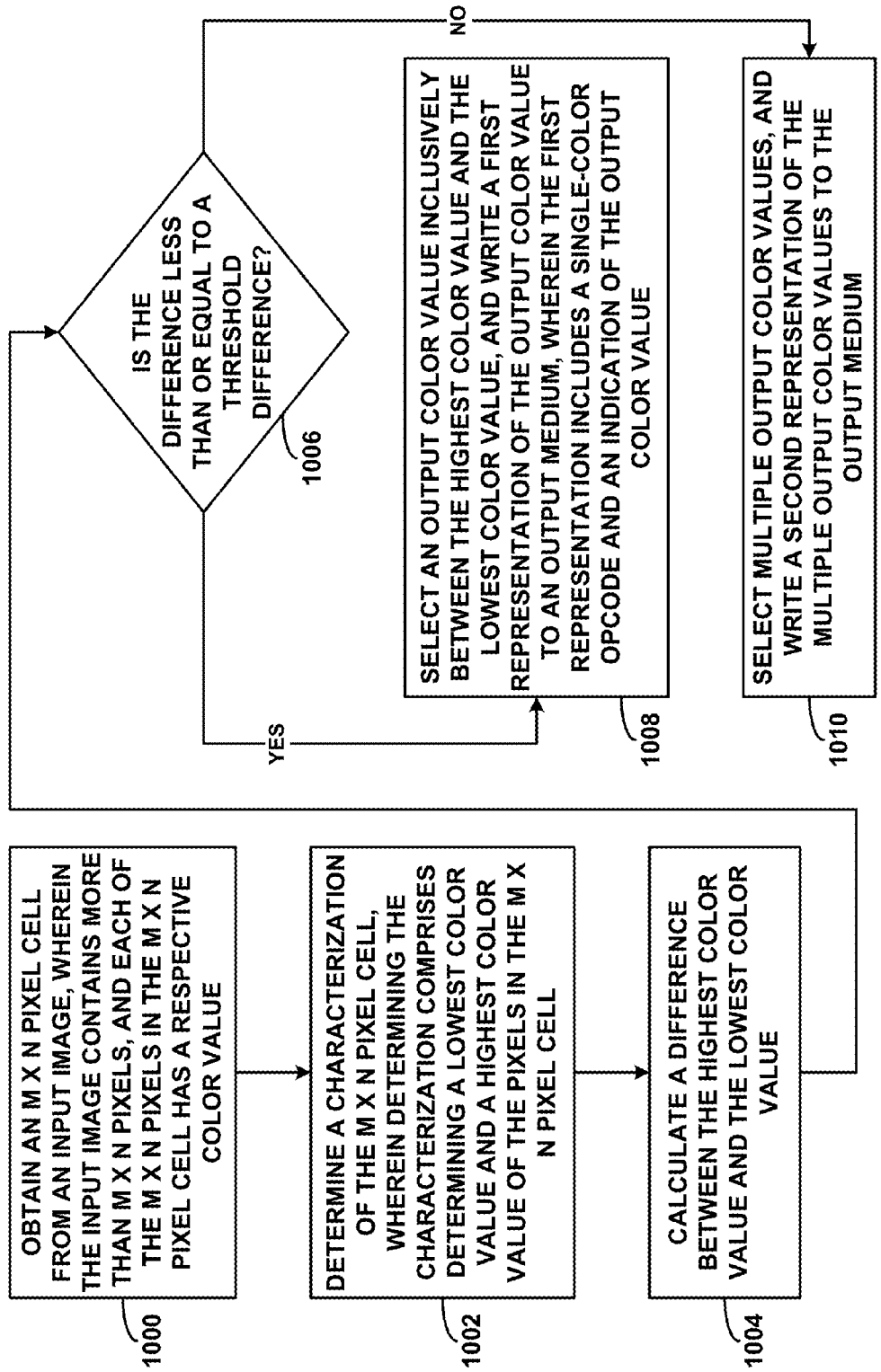
FIG. 10 is a flow chart, according to an example embodiment.

FIG. 10 is a flow chart of an example embodiment. The steps illustrated by this flow chart may be carried out by one or more printing devices, such as printing device 100, and/or computing devices, such as computing device 300. Further, aspects of each individual step may be distributed between multiple computing devices.

At step 1000, an m×n pixel cell may be obtained from an input image. The input image may contain more than m×n pixels, and each of the m×n pixels in the m×n pixel cell may have a respective color value. In some embodiments, the m×n pixel cell may be only associated with color values from a single color channel of the input image.

At step 1002 a characterization of the m×n pixel cell may be determined. Determining the characterization may involve determining a lowest color value and a highest color value of the pixels in the m×n pixel cell.

Determining the characterization may further involve determining a histogram of color values for the m×n pixel cell, and obtaining, from the histogram, a second-lowest color value and a second-highest color value of the pixels in the m×n pixel cell. The second-lowest color value may be adjacent to (or within a threshold of) the lowest color value and the second-highest color value may be adjacent to (or within a threshold of) the highest color value. Then, it may be determined, from the histogram, that no color value other than the lowest color value, the second-lowest color value, the second-highest color value, and the highest color value are in the m×n pixel cell, and selecting multiple output color values may include selecting one of the lowest color value and the second-lowest color value, and one of the second-highest color value and the highest color value.

At step 1004 a difference between the highest color value and the lowest color value may be calculated. At step 1006, it may be determined whether the difference is less than or equal to a threshold difference.

If the difference is less than or equal to the threshold difference, then, at step 1008, an output color value may be selected from color values between the highest color value and the lowest color value, inclusive. Also at step 1008, a first representation of the output color value may be written to an output medium. The first representation may include a single-color opcode and an indication of the output color value. If the difference is greater than the threshold difference, than, at step 1010, multiple output color values may be selected, and a second representation of the multiple output color values may be written to the output medium.

Based on the representation written to the output medium (e.g., the first representation or the second representation), an approximation of the m×n pixel cell may be recreated on an output device. The output device may or may not be closely associated with the output medium. For instance, the output medium may be data storage within a printing device and the output device may be the printing device. Alternatively, the output medium may be data storage within a computing device and the output device may be the printing device.

The multiple output color values may consist of two output color values, and the second representation may include a two-color opcode, an indication of each of the two output color values, and a per-pixel bitmap of the m×n pixel cell that associates each pixel in the m×n pixel cell with one of the two output colors. Alternatively, the multiple output color values consist of up to four output color values, and the second representation may include a four-color opcode, an indication of each of the up to four output color values, and a per-pixel bitmap of the m×n pixel cell that associates each pixel in the m×n pixel cell with one of the up to four output colors.

In some embodiments, determining the characterization may further involve determining a histogram of color values for the m×n pixel cell, and obtaining, from the histogram, a first intermediate color value and a second intermediate color value of the pixels in the m×n pixel cell. Each of the first intermediate color value and the second intermediate color value may be between the lowest color value and the highest color value. Then it may be determined, from the histogram, that no color value other than (i) the lowest color value, (ii) the first intermediate color value, (iii) the second intermediate color value, (iv) the highest color value, and (v) one or more color values adjacent to one of the lowest color value, the first intermediate color value, the second intermediate color value, and the highest color value, are in the m×n pixel cell. In this case, selecting multiple output color values may include selecting colors at or proximate to each of the lowest color value, the first intermediate color value, the second intermediate color value, and the highest color value as the four output colors. Alternatively, more than two intermediate colors may be used.

Some embodiments may further include performing a DCT operation on the m×n pixel cell. Accordingly, the multiple output color values may be based on a result of the DCT operation, and the second representation may include a DCT opcode and the result of the DCT operation.

Alternatively or additionally, the multiple output color values may consist of four output color values. Each of the four output color values may be a color value of a respective one of the corners of the m×n pixel cell, and the second representation may include a gradient opcode, and an indication of each of the four output color values. Moreover, in some of these scenarios, determining the characterization further involve deriving a template set of m×n pixels based on a bi-linear interpolation of the four output color values, comparing the pixel values of the m×n pixel cell to those of the template set, and determining that the pixel values of the m×n pixel cell at least approximately match those of the template set.

Figure 11A:
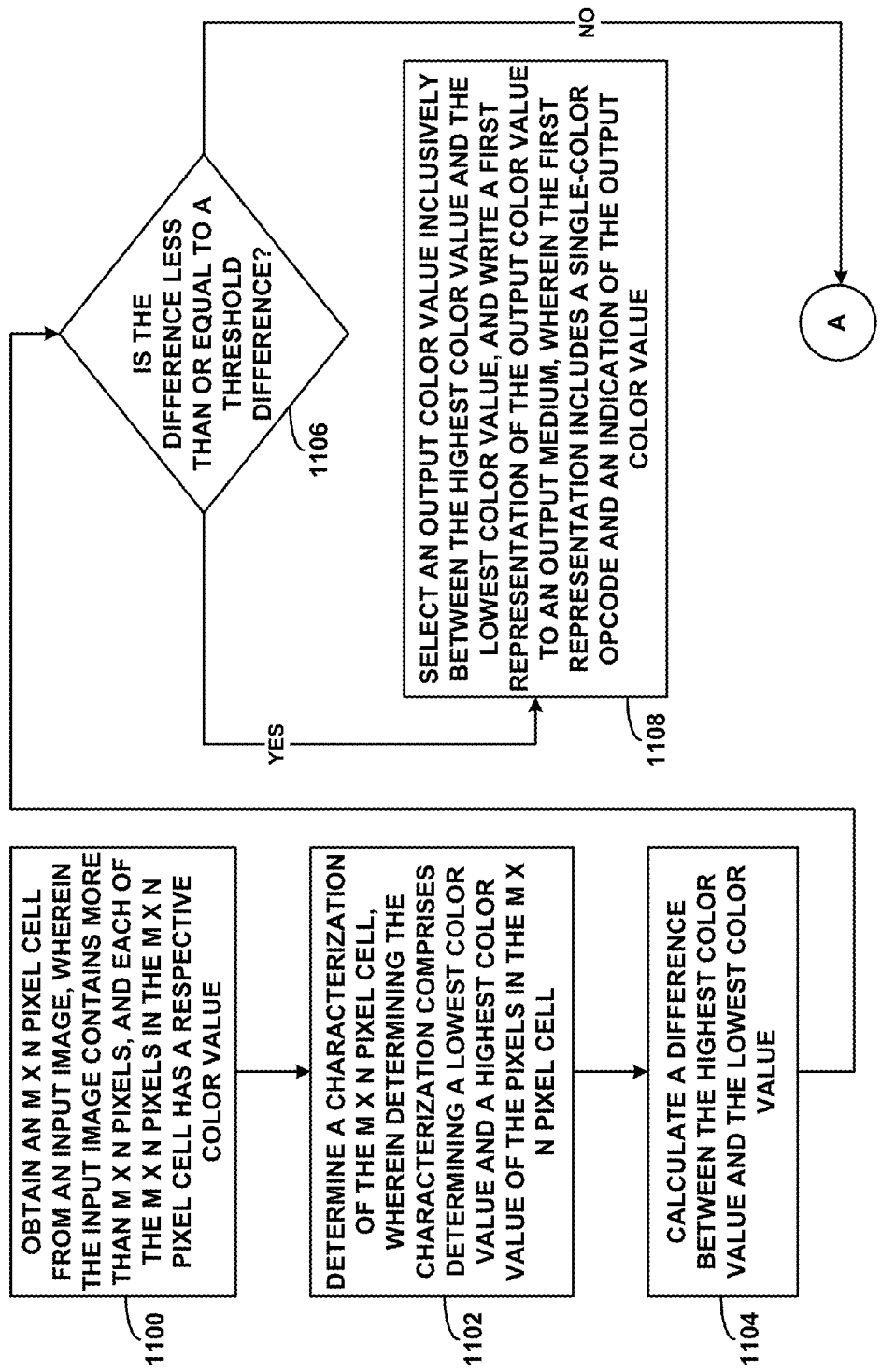
FIGS. 11A and 11B are another flow chart, according to an example embodiment.
Figure 11B:
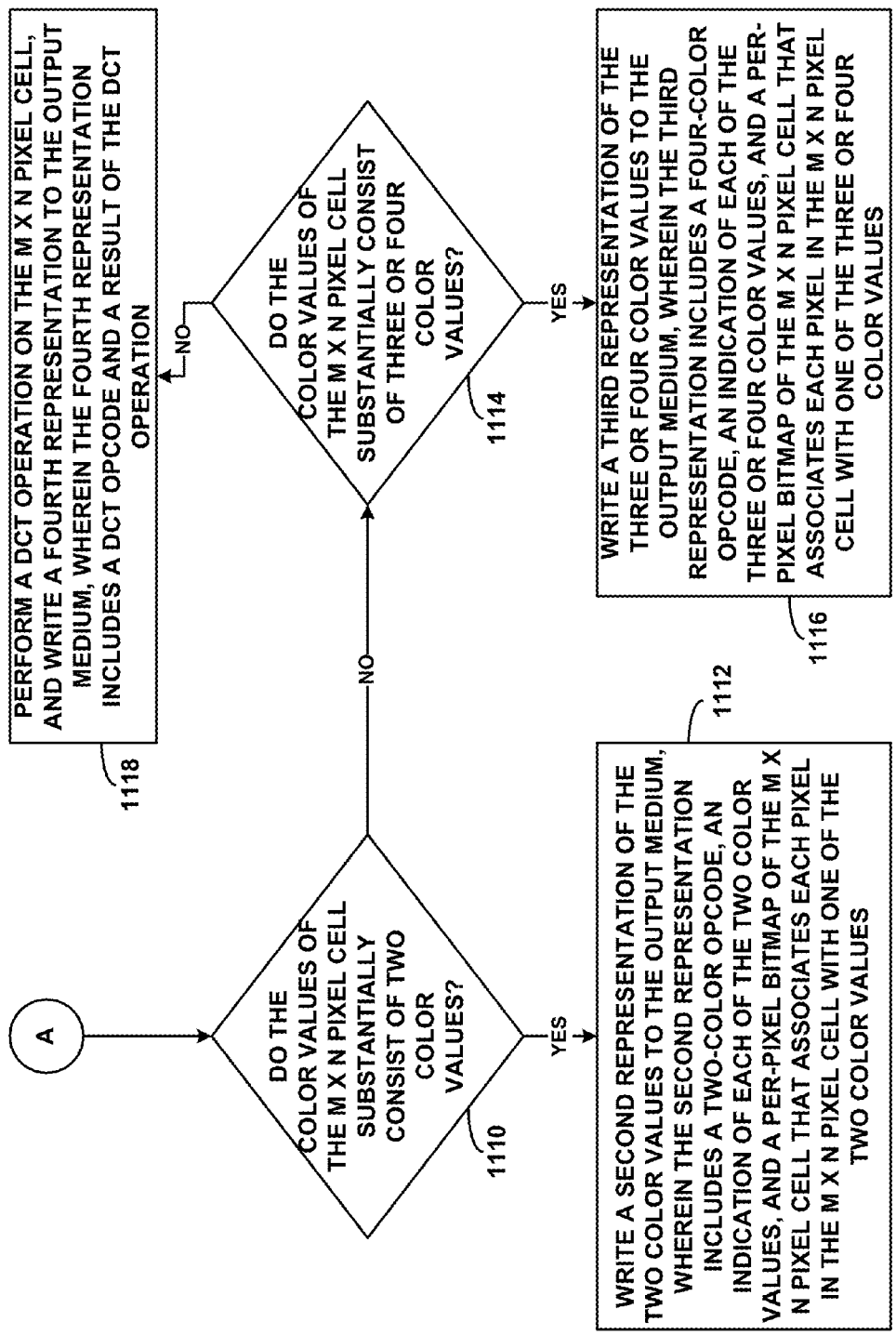

FIGS. 11A and 11B are a flow chart of another example embodiment, further illustrating cell-based compression. At step 1100, an m×n pixel cell may be obtained from an input image. The input image may contain more than m×n pixels, and each of the m×n pixels in the m×n pixel cell may have a respective color value;

At step 1102, a characterization of the m×n pixel cell may be determined. Determining the characterization may involve determining color values of the pixels in the m×n pixel cell.

At step 1104, a difference between a highest color value and a lowest color value of the color values may be calculated. At step 1106, the difference may be compared to a threshold difference.

If the difference is less than or equal to a threshold difference, then, at step 1108, an output color value between the highest color value and the lowest color value, inclusive, may be selected. Additionally, a first representation of the output color value may be written to an output medium. The first representation may include a single-color opcode and an indication of the output color value.

If the difference is greater than the threshold difference, then, at step 1110, it may be determined whether the color values of the m×n pixel cell substantially consist of two color values. The color values of the m×n pixel cell may be considered to substantially consist of two color values if (i) there are only two color values in the cell, (ii) there are three color values in the cell and at least two of those three color values are sequential in number, (iii) there are four color values in the cell and at least two pairs of these color values are each sequential in number, (iv) all of the color values in the cell are clustered around one or two color values, or (v) based on some other observation of the color values in the cell.

If the color values of the m×n pixel cell substantially consist of two color values, then, at step 1112, a second representation of the two color values may be written to the output medium. The second representation may include a two-color opcode, an indication of each of the two color values, and a per-pixel bitmap of the m×n pixel cell that associates each pixel in the m×n pixel cell with one of the two color values.

If the color values of the m×n pixel cell substantially consist of more than two color values, then, at step 1114, it may be determined whether the color values of the m×n pixel cell substantially consist of three or four color values. The color values of the m×n pixel cell may be considered to substantially consist of three or four color values if (i) there are only three or four color values in the cell, (ii) there are five to eight color values in the cell and these color values are such that at least two are sequential in number, (iii) all of the color values in the cell are clustered around three or four color values, or (iv) based on some other observation of the color values in the cell.

If the color values of the m×n pixel cell substantially consist of three or four color values, then, at step 1116, a third representation of the three or four color values may be written to the output medium. The third representation may include a four-color opcode, an indication of each of the three or four color values, and a per-pixel bitmap of the m×n pixel cell that associates each pixel in the m×n pixel cell with one of the three or four color values.

If the color values of the m×n pixel cell substantially consist of more than four color values, then, at step 1118, a discrete cosine transformation (DCT) operation may be performed on the m×n pixel cell, and a fourth representation may be written to the output medium. The fourth representation may include a DCT opcode and a result of the DCT operation.

5. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions.

Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   a computing device obtaining an m×n pixel cell from an input image, wherein the input image contains more than m×n pixels, and each of the m×n pixels in the m×n pixel cell has a respective color value;
   the computing device determining a characterization of the m×n pixel cell, wherein determining the characterization comprises determining a lowest color value and a highest color value of the pixels in the m×n pixel cell;
   the computing device calculating a difference between the highest color value and the lowest color value;
   if the difference is less than or equal to a threshold difference, the computing device selecting an output color value inclusively between the highest color value and the lowest color value, and writing a first representation of the output color value to an output medium, wherein the first representation includes a single-color opcode and an indication of the output color value; and
   if the difference is greater than the threshold difference, the computing device selecting multiple output color values, and writing a second representation of the multiple output color values to the output medium.

2. The method of claim 1, wherein the m×n pixel cell is only associated with color values from a single color channel of the input image.

3. The method of claim 1, wherein the multiple output color values consist of two output color values, and wherein the second representation includes a two-color opcode, an indication of each of the two output color values, and a per-pixel bitmap of the m×n pixel cell that associates each pixel in the m×n pixel cell with one of the two output colors.

4. The method of claim 3, wherein determining the characterization further comprises:
   determining a histogram of color values for the m×n pixel cell;
   obtaining, from the histogram, a second-lowest color value and a second-highest color value of the pixels in the m×n pixel cell, wherein the second-lowest color value is within a threshold of the lowest color value and the second-highest color value is within the threshold of the highest color value; and
   determining, from the histogram, that no color value other than the lowest color value, the second-lowest color value, the second-highest color value, and the highest color value are in the m×n pixel cell, wherein selecting multiple output color values comprises selecting one of the lowest color value and the second-lowest color value, and one of the second-highest color value and the highest color value.

5. The method of claim 1, wherein the multiple output color values consist of up to four output color values, and wherein the second representation includes a four-color opcode, an indication of each of the up to four output color values, and a per-pixel bitmap of the m×n pixel cell that associates each pixel in the m×n pixel cell with one of the up to four output colors.

6. The method of claim 5, wherein determining the characterization further comprises:
   determining a histogram of color values for the m×n pixel cell;
   obtaining, from the histogram, a first intermediate color value and a second intermediate color value of the pixels in the m×n pixel cell, wherein each of the first intermediate color value and the second intermediate color value are between the lowest color value and the highest color value; and
   determining, from the histogram, that no color value other than the lowest color value, the first intermediate color value, the second intermediate color value, the highest color value, and one or more color values adjacent to one of the lowest color value, the first intermediate color value, the second intermediate color value, and the highest color value are in the m×n pixel cell, wherein selecting multiple output color values comprises selecting colors at or proximate to each of the lowest color value, the first intermediate color value, the second intermediate color value, and the highest color value as the four output colors.

7. The method of claim 1, further comprising:
   performing a discrete cosine transformation (DCT) operation on the m×n pixel cell, wherein the multiple output color values are based on a result of the DCT operation, and wherein the second representation includes a DCT opcode and the result of the DCT operation.

8. The method of claim 1, wherein the multiple output color values consist of four output color values, wherein each of the four output color values is a color value of a respective one of the corners of the m×n pixel cell, and wherein the second representation includes a gradient opcode, and an indication of each of the four output color values.

9. The method of claim 8, wherein determining the characterization further comprises:
deriving a template set of m×n pixels based on a bi-linear interpolation of the four output color values;
comparing the pixel values of the m×n pixel cell to those of the template set; and
determining that the pixel values of the m×n pixel cell at least approximately match those of the template set.

10. The method of claim 1, further comprising:
based on the representation written to the output medium, recreating, on an output device, an approximation of the m×n pixel cell.

11. An article of manufacture including a non-transitory computer-readable medium, having stored thereon program instructions that, upon execution by a computing device, cause the computing device to perform operations comprising:
obtaining an m×n pixel cell from an input image, wherein the input image contains more than m×n pixels, and each of the m×n pixels in the m×n pixel cell has a respective color value;
determining a characterization of the m×n pixel cell, wherein determining the characterization comprises determining a lowest color value and a highest color value of the pixels in the m×n pixel cell;
calculating a difference between the highest color value and the lowest color value;
if the difference is less than or equal to a threshold difference, selecting an output color value inclusively between the highest color value and the lowest color value, and writing a first representation of the output color value to an output medium, wherein the first representation includes a single-color opcode and an indication of the output color value; and
if the difference is greater than the threshold difference, selecting multiple output color values, and writing a second representation of the multiple output color values to the output medium.

12. The article of manufacture of claim 11, wherein the m×n pixel cell is only associated with color values from a single color channel of the input image.

13. The article of manufacture of claim 11, wherein the multiple output color values consist of two output color values, and wherein the second representation includes a two-color opcode, an indication of each of the two output color values, and a per-pixel bitmap of the m×n pixel cell that associates each pixel in the m×n pixel cell with one of the two output colors.

14. The article of manufacture of claim 13, wherein determining the characterization further comprises:
determining a histogram of color values for the m×n pixel cell;
obtaining, from the histogram, a second-lowest color value and a second-highest color value of the pixels in the m×n pixel cell, wherein the second-lowest color value is within a threshold of the lowest color value and the second-highest color value is within the threshold of the highest color value; and
determining, from the histogram, that no color value other than the lowest color value, the second-lowest color value, the second-highest color value, and the highest color value are in the m×n pixel cell, wherein selecting multiple output color values comprises selecting one of the lowest color value and the second-lowest color value, and one of the second-highest color value and the highest color value.

15. The article of manufacture of claim 11, wherein the multiple output color values consist of up to four output color values, and wherein the second representation includes a four-color opcode, an indication of each of the up to four output color values, and a per-pixel bitmap of the m×n pixel cell that associates each pixel in the m×n pixel cell with one of the up to four output colors.

16. The article of manufacture of claim 15, wherein determining the characterization further comprises:
determining a histogram of color values for the m×n pixel cell;
obtaining, from the histogram, a first intermediate color value and a second intermediate color value of the pixels in the m×n pixel cell, wherein each of the first intermediate color value and the second intermediate color value are between the lowest color value and the highest color value; and
determining, from the histogram, that no color value other than the lowest color value, the first intermediate color value, the second intermediate color value, the highest color value, and one or more color values adjacent to one of the lowest color value, the first intermediate color value, the second intermediate color value, and the highest color value are in the m×n pixel cell, wherein selecting multiple output color values comprises selecting colors at or proximate to each of the lowest color value, the first intermediate color value, the second intermediate color value, and the highest color value as the four output colors.

17. The article of manufacture of claim 11, further comprising:
performing a discrete cosine transformation (DCT) operation on the m×n pixel cell, wherein the multiple output color values are based on a result of the DCT operation, and wherein the second representation includes a DCT opcode and the result of the DCT operation.

18. The article of manufacture of claim 11, wherein the multiple output color values consist of four output color values, wherein each of the four output color values is a color value of a respective one of the corners of the m×n pixel cell, and wherein the second representation includes a gradient opcode, and an indication of each of the four output color values.

19. The article of manufacture of claim 18, wherein determining the characterization further comprises:
deriving a template set of m×n pixels based on a bi-linear interpolation of the four output color values;
comparing the pixel values of the m×n pixel cell to those of the template; and
determining that the pixel values of the m×n pixel cell at least approximately match those of the template.

20. A method comprising:
a computing device obtaining an m×n pixel cell from an input image, wherein the input image contains more than m×n pixels, and each of the m×n pixels in the m×n pixel cell has a respective color value;
the computing device determining a characterization of the m×n pixel cell, wherein determining the characterization comprises determining color values of the pixels in the m×n pixel cell;
the computing device calculating a difference between a highest color value and a lowest color value of the color values;

if the difference is less than or equal to a threshold difference, the computing device selecting an output color value inclusively between the highest color value and the lowest color value, and writing a first representation of the output color value to an output medium, wherein the first representation includes a single-color opcode and an indication of the output color value;

else if the color values of the m×n pixel cell substantially consist of two color values, the computing device writing a second representation of the two color values to the output medium, wherein the second representation includes a two-color opcode, an indication of each of the two color values, and a per-pixel bitmap of the m×n pixel cell that associates each pixel in the m×n pixel cell with one of the two color values;

else if the color values of the m×n pixel cell substantially consist of three or four color values, the computing device writing a third representation of the three or four color values to the output medium, wherein the third representation includes a four-color opcode, an indication of each of the three or four color values, and a per-pixel bitmap of the m×n pixel cell that associates each pixel in the m×n pixel cell with one of the three or four color values; and else if the color values of the m×n pixel cell substantially consist of more than four color values, the computing device performing a discrete cosine transformation (DCT) operation on the m×n pixel cell, and writing a fourth representation to the output medium, wherein the fourth representation includes a DCT opcode and a result of the DCT operation.

* * * * *